(12) United States Patent
Oishi et al.

(10) Patent No.: US 12,397,628 B2
(45) Date of Patent: Aug. 26, 2025

(54) BATTERY UNIT MOUNTING STRUCTURE FOR VEHICLE

(71) Applicant: SUBARU CORPORATION, Tokyo (JP)

(72) Inventors: Yosuke Oishi, Tokyo (JP); Takayuki Tokunaga, Tokyo (JP); Keita Furukawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 321 days.

(21) Appl. No.: 18/134,822

(22) Filed: Apr. 14, 2023

(65) Prior Publication Data

US 2023/0347726 A1 Nov. 2, 2023

(30) Foreign Application Priority Data

Apr. 28, 2022 (JP) ................. 2022-074620

(51) Int. Cl.
*B60K 1/04* (2019.01)
*H01M 50/244* (2021.01)
*H01M 50/249* (2021.01)

(52) U.S. Cl.
CPC ............ *B60K 1/04* (2013.01); *H01M 50/244* (2021.01); *H01M 50/249* (2021.01); *B60K 2001/0416* (2013.01); *H01M 2220/20* (2013.01)

(58) Field of Classification Search
CPC ............ B60K 1/04; B60K 2001/0348; H01M 50/244; H01M 50/249; H01M 2220/20; Y02E 60/10
See application file for complete search history.

(56) References Cited

U.S. PATENT DOCUMENTS

| 8,464,817 | B2 * | 6/2013 | Usami | ..................... B60K 1/04 180/68.5 |
| 11,807,304 | B2 * | 11/2023 | Suzaki | ............... B62D 25/2009 |
| 2006/0289224 | A1 * | 12/2006 | Ono | ........................ B60L 1/003 180/311 |

(Continued)

FOREIGN PATENT DOCUMENTS

| JP | 2012-114069 A | 6/2012 |
| JP | 2016-164051 A | 9/2016 |
| JP | 2017-114190 A | 6/2017 |

*Primary Examiner* — Jason D Shanske
*Assistant Examiner* — James J Triggs
(74) *Attorney, Agent, or Firm* — MCGINN I.P. LAW GROUP, PLLC

(57) ABSTRACT

A battery unit mounting structure for a vehicle includes: left and right rear frames extending along a front-rear direction; a battery unit including a housing in which a battery is housed and which is disposed between the rear frames, and a battery frame provided with protruding portions extending in a vehicle width direction and protruding in the vehicle width direction beyond a space between the rear frames; and reinforcing plates provided permanently with the rear frames respectively in regions in which the rear frames and the protruding portions are respectively fixed to each other. Each of the reinforcing plates extends in the front-rear direction of the vehicle in a corresponding one of the regions in which the rear frames and the protruding portions are respectively fixed to each other. The battery frame and each of the rear frames are fixed to each other at first and second fastening portions.

5 Claims, 8 Drawing Sheets

(56) References Cited

U.S. PATENT DOCUMENTS

| | | | |
|---|---|---|---|
| 2012/0129029 A1 | 5/2012 | Yi et al. | |
| 2014/0151086 A1* | 6/2014 | Yamanaka | B60K 6/40 174/138 R |
| 2016/0257187 A1* | 9/2016 | Nakajima | B60K 1/04 |
| 2017/0174064 A1 | 6/2017 | Shinoda et al. | |
| 2017/0232913 A1* | 8/2017 | Fukazu | B60L 50/60 307/10.1 |
| 2017/0237379 A1* | 8/2017 | Fukazu | H02G 3/30 318/503 |
| 2019/0232776 A1* | 8/2019 | Matsuda | B60K 6/40 |
| 2020/0047804 A1* | 2/2020 | Taniguchi | G08G 1/096783 |

* cited by examiner

BATTERY UNIT MOUNTING STRUCTURE FOR VEHICLE

CROSS-REFERENCE TO RELATED APPLICATIONS

The present application claims priority from Japanese Patent Application No. 2022-074620 filed on Apr. 28, 2022, the entire contents of which are hereby incorporated by reference.

BACKGROUND

The disclosure relates to a mounting structure of a high-voltage battery unit to be mounted on a vehicle such as an automobile.

In recent years, in vehicles such as automobiles, a hybrid vehicle equipped with an electric motor as a drive source in addition to an internal combustion engine (engine) in the related art, an electric vehicle using an electric motor as a drive source, and the like have been generally put into practical use and are becoming widely used.

A high-voltage battery unit (hereinafter, simply referred to as a battery unit) including a high-voltage battery that drives an electric motor (hereinafter, simply referred to as a battery), a battery case in which the battery is housed, and the like is mounted on this type of vehicle. In a vehicle in the related art, the battery unit is generally disposed on a bottom surface portion of a rear luggage compartment of the vehicle or the like.

This type of battery unit tends to have a larger external size as a battery capacity increases. Therefore, when a battery with a larger capacity is mounted on a vehicle, there is a tendency that a vehicle body stroke amount is reduced, for example, at the time of rear collision or the like.

In the related art, a method is adopted in which, at the time of collision from a rear of a vehicle, a bumper beam or a rear frame is deformed to absorb collision energy, thereby preventing deformation of the battery unit caused by the collision energy. Since a battery employed in the battery unit of this type of vehicle is a high-voltage battery, there is a demand to avoid as much as possible an increase in contact between a part of a battery case crushed due to deformation of the battery case and the battery or input of the collision energy to the battery.

As described above, when the vehicle body stroke amount at the time of collision is reduced with the increase in size of the battery unit, the collision energy is not sufficiently absorbed by deformation of a vehicle body frame member, and as a result, there is a problem that the collision energy to be input to the battery case increases. Therefore, it is necessary to take measures such as making the battery case itself stronger. However, when the measures to secure the strength of the battery case are adopted, there is a problem that a weight of the battery case increases, and a manufacturing cost increases.

Therefore, in the related art, various proposals on a battery unit mounting structure that prevents a collision energy at the time of collision from being input to a battery case while achieving a decrease in weight and a decrease in manufacturing cost of the battery case have been made, for example, in Japanese Unexamined Patent Application Publication (JP-A) No. 2017-114190, Japanese Unexamined Patent Application Publication (JP-A) No. 2012-114069, Japanese Unexamined Patent Application Publication (JP-A) No. 2016-164051, and the like.

A battery unit mounting structure disclosed in JP-A No. 2017-114190 is a structure that includes a battery case in which a battery is housed, and a suspension frame that supports the battery case in a suspending state, and in which a fragile portion that is bent when receiving an impact is provided in the vicinity of a fastening part of the suspension frame with respect to a vehicle body frame, and an impact on the battery case is reduced by moving the battery case forward.

A battery unit mounting structure disclosed in JP-A No. 2012-114069 is a structure in which a reinforcing member is provided on a lower surface or an upper surface of a battery unit, and a load (for example, an input load due to a side collision) input to one of a pair of left and right vehicle body frame members is transmitted to the other vehicle body frame member, thereby reducing the load to be input to the battery unit.

A battery unit mounting structure disclosed in JP-A No. 2016-164051 is a structure in which a reinforcing member is provided on a bottom surface of the battery case to disperse a load input to a case wall surface, thereby reducing deformation of the battery case and damage to a battery housed in the case.

SUMMARY

An aspect of the disclosure provides a battery unit mounting structure for a vehicle. The battery unit mounting structure includes a left rear frame and a right rear frame in a pair, a battery unit, and reinforcing plates. The left rear frame and the right rear frame extend along a front-rear direction of the vehicle. The battery unit includes a housing in which a battery is housed. The housing is disposed between the left rear frame and the right rear frame. The battery frame is provided with, at respective ends thereof, a left protruding portion and a right protruding portion each of which is provided permanently with a part of an opening side peripheral edge of the housing, extends in a vehicle width direction, and protrudes in the vehicle width direction beyond a space between the left rear frame and the right rear frame. The left protruding portion and the right protruding portion are fixed to respective upper surfaces of the left rear frame and the right rear frame. The reinforcing plates are provided permanently with the left rear frame and the right rear frame in respective regions in which left rear frame and the left protruding portion are fixed to each other and the right rear frame and right left protruding portion are fixed to each other. Each of the reinforcing plates extends in the front-rear direction of the vehicle in a corresponding one of the regions. The battery frame and each of the left rear frame and the right rear frame are fixed to each other at a first fastening portion on a rear side of a corresponding one of the left protruding portion and the right protruding portion and a second fastening portion on a front side of the corresponding one of the left protruding portion and the right protruding portion.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

In a battery unit mounting structures in the related art disclosed in the above publications or the like, there is still room for improvement to efficiently absorb the collision energy input from the outside and to reduce the deformation of the battery case.

It is desirable to provide a battery unit mounting structure for a vehicle that can efficiently increase an amount of absorption of collision energy and reduce an amount of deformation of a battery case, while achieving a decrease in weight and a decrease in manufacturing cost of the battery case.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, numbers and positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
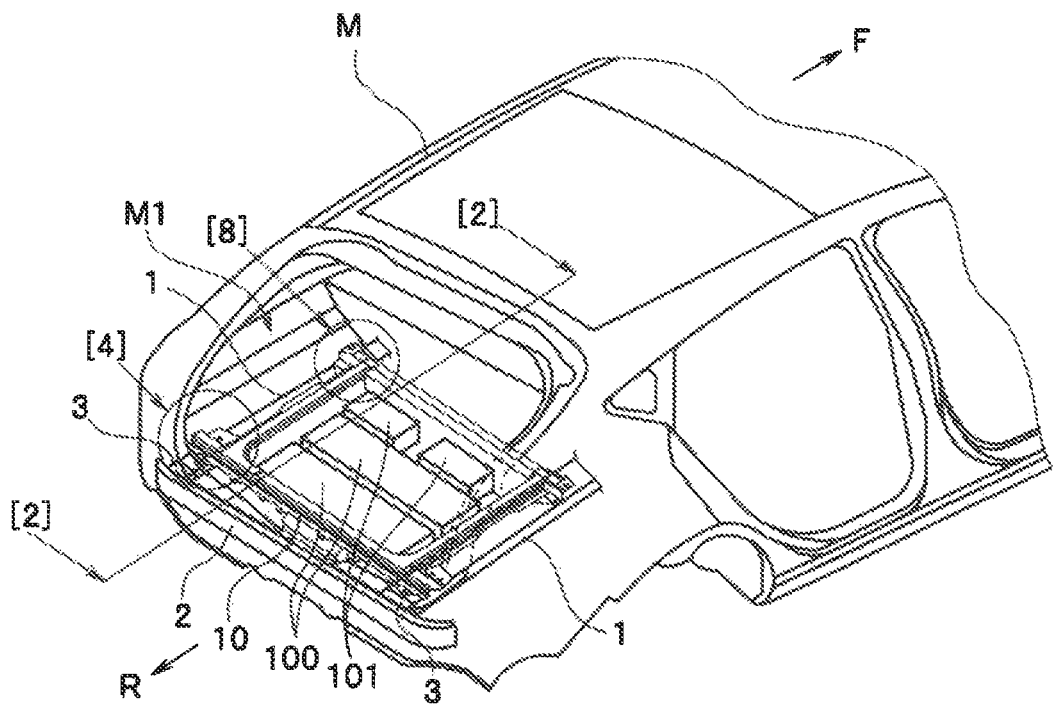
FIG. 1 is a schematic view of a battery unit mounting structure for a vehicle according to an embodiment of the disclosure.
Figure 2:
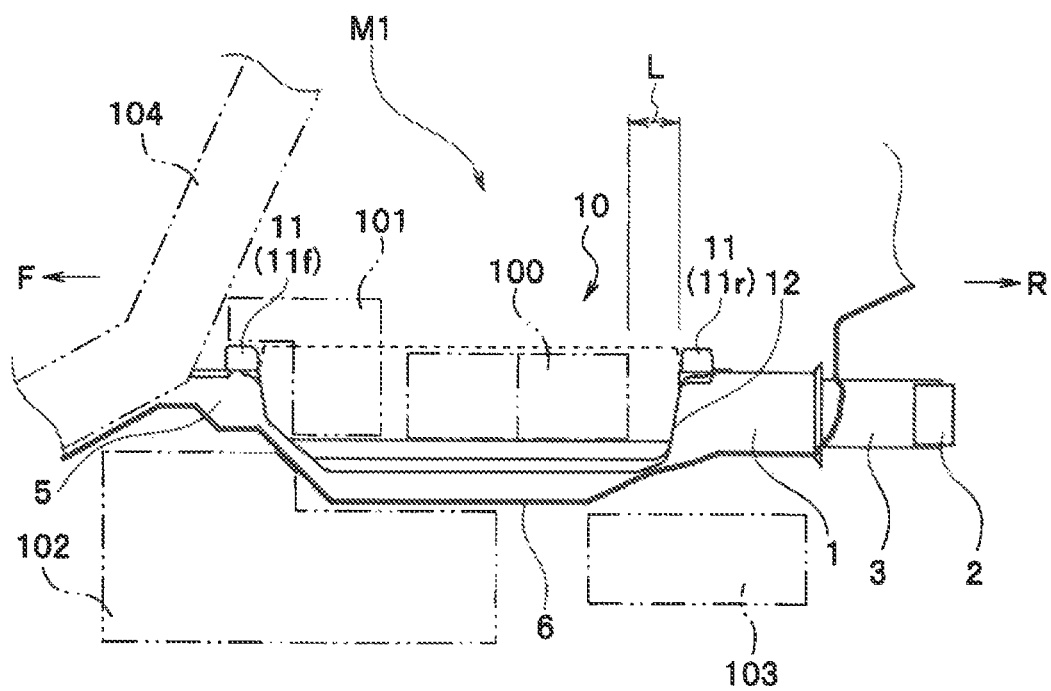
FIG. 2 is a conceptual diagram illustrating the battery unit mounting structure in a cross section taken along a line [2]-[2] in FIG. 1.

A battery unit mounting structure for a vehicle according to one embodiment of the disclosure will be described below with reference to the drawings. FIG. 1 is a view illustrating an outline of the battery unit mounting structure for a vehicle according to the embodiment of the disclosure. FIG. 2 is a conceptual diagram illustrating the battery unit mounting structure in a cross section taken along a line [2]-[2] in FIG. 1.

Figure 3:
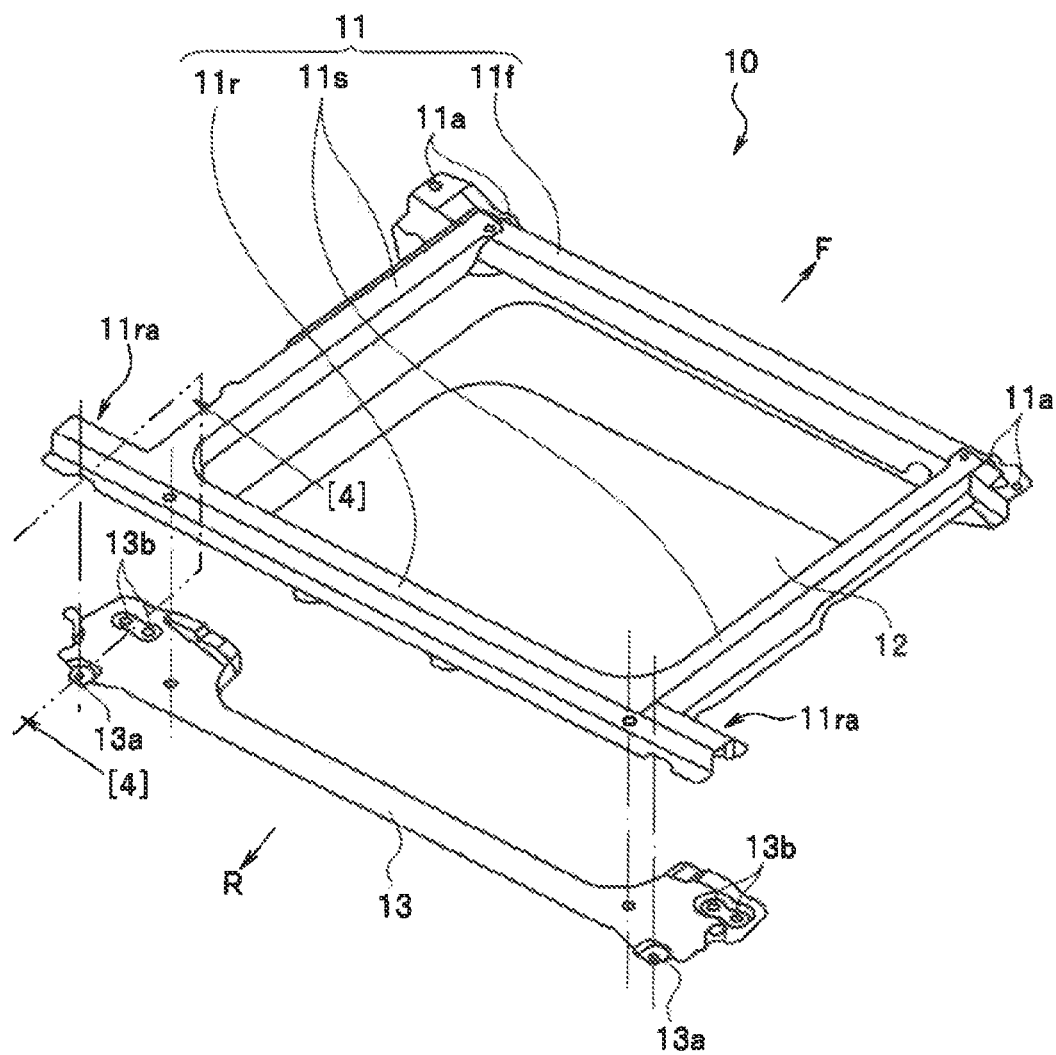
FIG. 3 is a partially exploded perspective view illustrating main parts of a battery unit in FIG. 1.

FIG. 3 is a partially exploded perspective view illustrating main parts of a battery unit in FIG. 1. In FIG. 3, in order to avoid complication of the drawing, illustration of constituent members housed in the battery unit is omitted, and elements directly related to the disclosure (basic constituent members of the battery unit) are illustrated.

Figure 4:
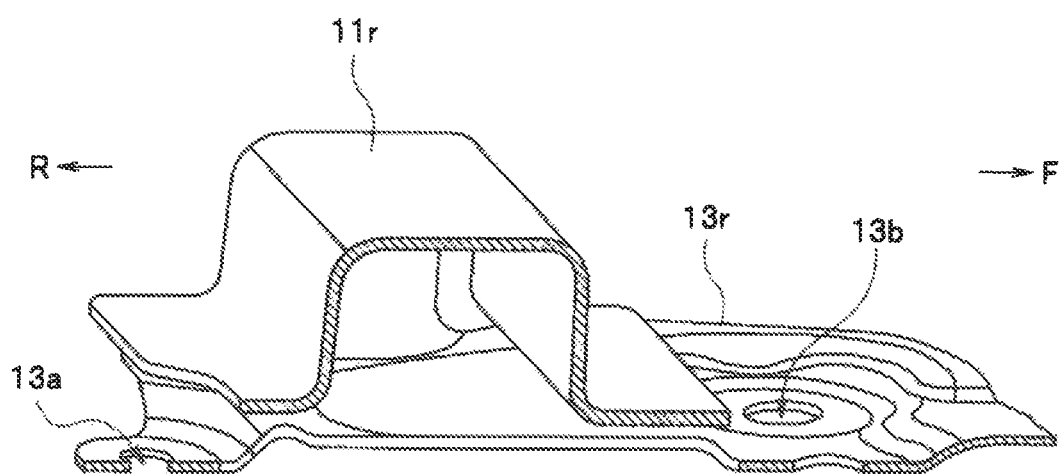
FIG. 4 is a perspective view schematically illustrating a structure of a main part of a rear battery frame of a battery frame in the battery unit in FIG. 3.

FIGS. 4 to 7 are enlarged views illustrating a rear region (region indicated by a reference sign [4] in FIG. 1) in a joint region between a battery frame and a rear side frame in the battery unit. Of these, FIG. 4 is a perspective view schematically illustrating a structure of a main part of a rear battery frame. FIG. 4 illustrates a state of being cut in a cross section taken along a line [4] to [4] in FIG. 3. Here, FIG. 4 illustrates a state in which the rear battery frame and a rear bracket are assembled.

Figure 5:
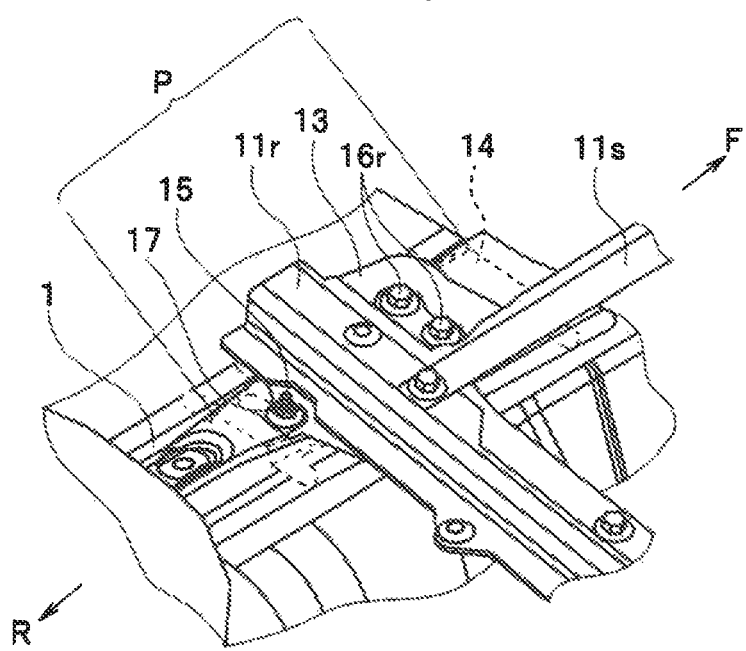
FIG. 5 is an enlarged perspective view illustrating a rear region (region indicated by a reference sign [4] in FIG. 1) in a joint region between the battery frame and a rear side frame in the battery unit in FIG. 3.
Figure 6:
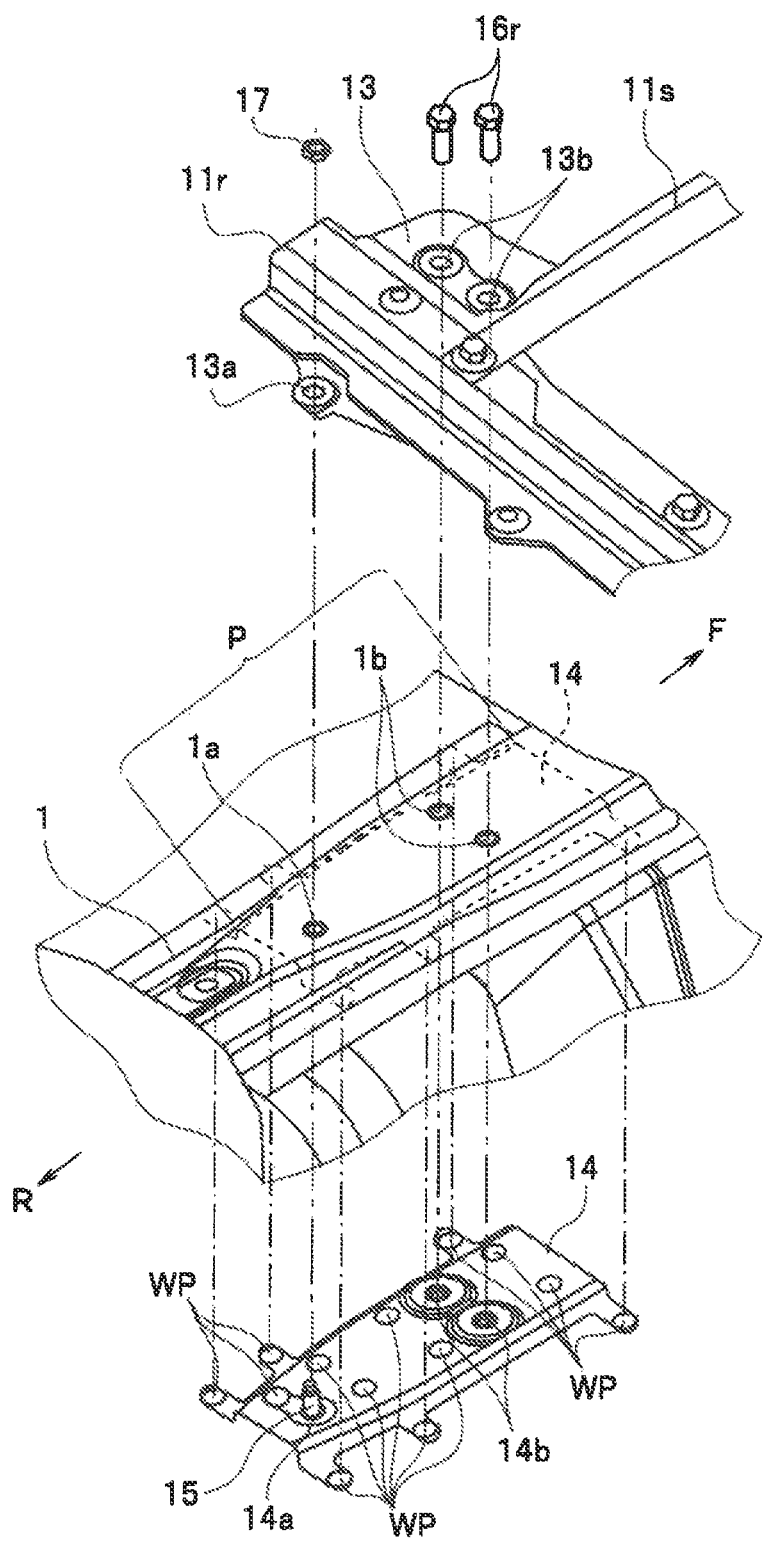
FIG. 6 is an exploded perspective view of FIG. 5.
Figure 7:
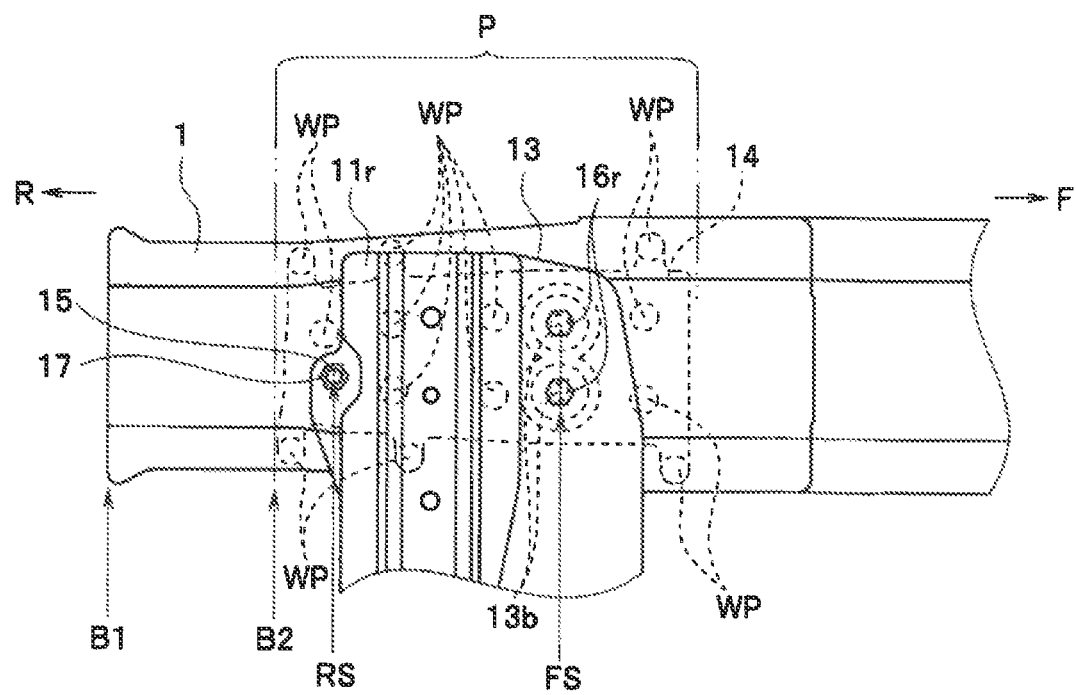
FIG. 7 is a plan view of FIG. 5 as viewed from above.

FIG. 5 is a main-part enlarged perspective view illustrating an assembled state of a joint portion between the rear battery frame and the rear side frame in the battery unit (region indicated by the reference sign [4] in FIG. 1). FIG. 6 is an exploded perspective view of FIG. 5. FIG. 7 is a plan view of FIG. 5 as viewed from above.

Figure 8:
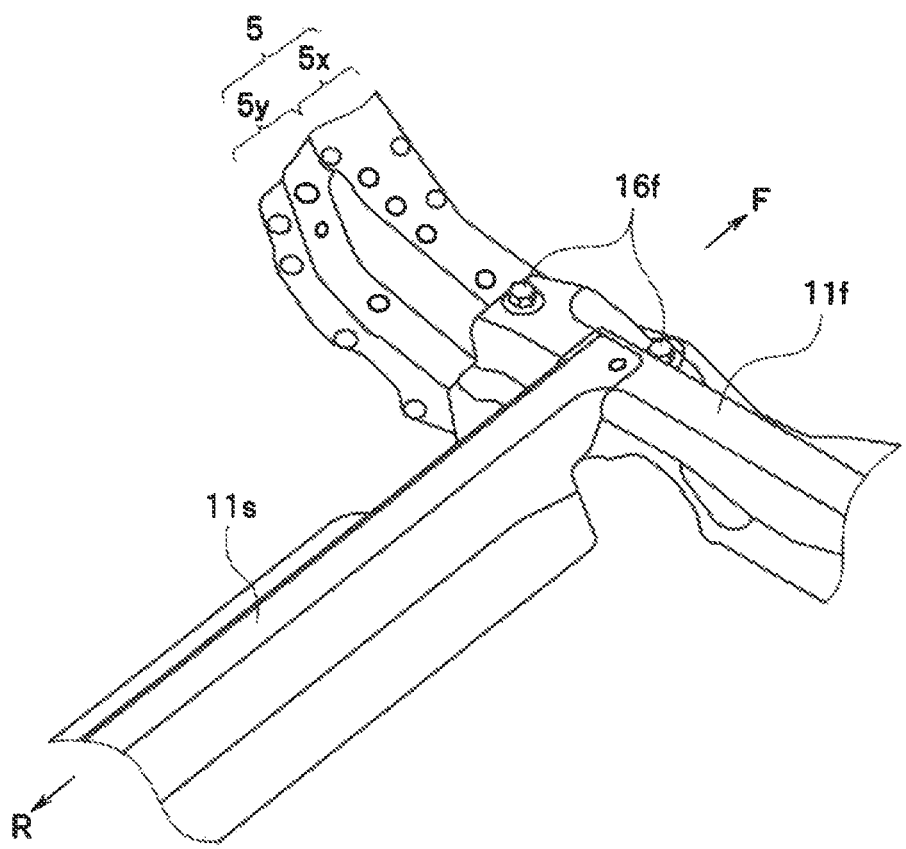
FIG. 8 is an enlarged perspective view illustrating a front region (region indicated by a reference sign [8] in FIG. 1) in the joint region between the battery frame and the rear side frame in the battery unit in FIG. 3.
Figure 9:
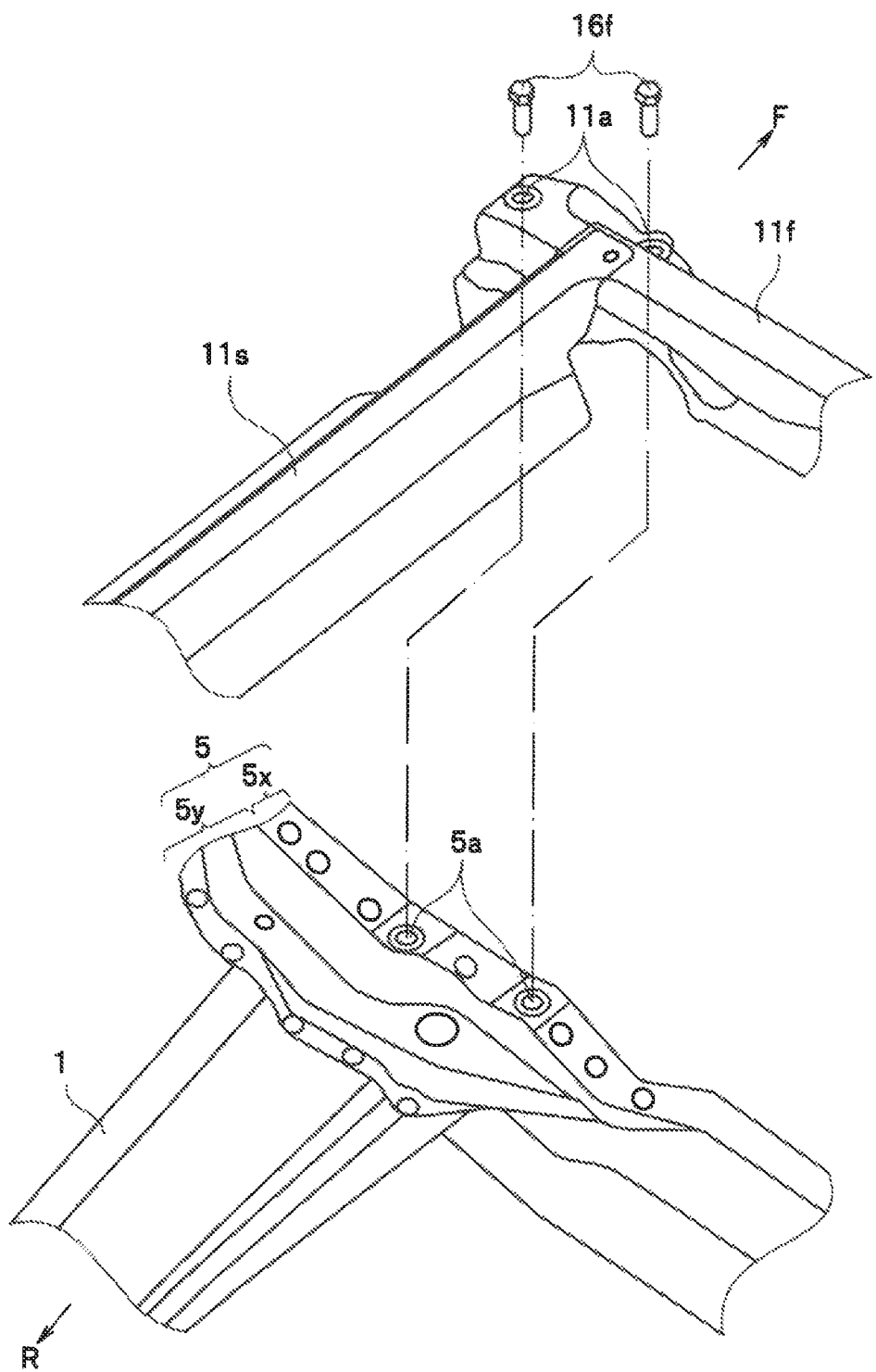
FIG. 9 is an exploded perspective view of FIG. 8.

FIGS. 8 and 9 are enlarged views illustrating a front region (region indicated by a reference sign [8] in FIG. 1) in the joint region between the battery frame and the rear side frame in the battery unit. Of these, FIG. 8 is a main-part enlarged perspective view illustrating a joined state of a front battery frame, the rear side frame, and a cross member in the battery unit. FIG. 9 is an exploded perspective view of FIG. 8.

In FIGS. 1 to 9, a direction indicated by an arrow F indicates a front side of the vehicle. In addition, in FIGS. 1 to 9, a direction indicated by an arrow R indicates a rear side of the vehicle. In the following description, a front side refers to the side indicated by the arrow F. Similarly, in the following description, a rear side refers to the side indicated by the arrow R (the same applies to FIGS. 10A-10C to be described later).

First, an outline of the battery unit mounting structure for a vehicle according to the embodiment of the disclosure will be briefly described below with reference to FIGS. 1 and 2.

As illustrated in FIGS. 1 and 2, a vehicle M according to the present embodiment includes a battery unit 10 mounted on a floor panel 6 (see FIG. 2) of a rear luggage compartment M1. The battery unit 10, the details of which will be described later, includes a battery case 12 and a battery frame 11 provided on an opening side peripheral edge of the battery case 12 (see FIG. 2 or FIG. 3 to be described later). A battery (storage battery) 100, auxiliaries 101, and the like are housed inside the battery unit 10.

Rear side frames 1, which are a pair of rear frames, are provided on a rear side of the vehicle M. The pair of rear side frames 1 extend along a front-rear direction of the vehicle, and are disposed in the vicinity of both left and right end edges of the vehicle M with a space therebetween in a width direction of the vehicle M.

As will be described in detail later, a front battery frame 11f and a rear battery frame 11r of the battery frame 11 of the battery unit 10, which are provided in the front-rear direction of the vehicle M, are fixed to upper surfaces of the pair of rear side frames 1, respectively.

Extensions 3 are joined to rear ends of the pair of rear side frames 1, respectively. Each extension 3 is joined to a rear bumper beam 2 extending in a vehicle width direction.

The rear ends of the pair of rear side frames 1 are coupled to each other by a first rear cross member 4 (not illustrated in FIGS. 1 and 2, see FIGS. 10A-10C to be described later) extending to left and right in the vehicle width direction. Similarly, front ends of the rear side frames 1 are coupled to each other by a second rear cross member 5 (not illustrated in FIG. 1, see FIG. 2 and FIG. 9 to be described later) extending to the left and right in the vehicle width direction.

As illustrated in FIG. 2, a chassis part 102, a muffler 103, and the like are disposed outside the floor panel 6 of the rear luggage compartment M1. In addition, a seat 104 or the like is disposed in front of the rear luggage compartment M1. Since these constituent units are portions that are not directly related to the disclosure, an arrangement thereof is illustrated by two-dot chain lines in FIG. 2. Such a configuration is substantially the same as an internal configuration of a vehicle such as an automobile in the related art.

A reference sign L illustrated in FIG. 2 indicates a shortest separation distance between an inner wall surface of (a rear end side of) the rear battery frame 11r or the battery case 12 and an outer wall surface (a rear end side) of a battery 100. The shortest separation distance L refers to a distance range in which a member on a battery case side does not come into contact with the battery 100 inside the battery case when (the rear end side of) the rear battery frame 11r or the battery case 12 is crushed by a collision impact or the like from a rear. Therefore, it is considered that the crushing of the rear battery frame 11r or the battery case 12 is allowed within the range of the shortest separation distance L.

Next, details of the battery unit mounting structure of the present embodiment will be described below with reference to FIGS. 3 to 9. As illustrated in FIG. 3 or the like, a basic configuration of the battery unit 10 includes the battery frame 11, the battery case 12, a rear bracket 13, and the like.

The battery frame 11 includes a rear battery frame 11r, a front battery frame 11f, and two side battery frames 11s. The battery frame 11 is formed into a substantially rectangular frame as a whole by four frame members (11r, 11f, and 11s). In this case, the rear battery frame 11r has protruding portions 11ra protruding by a predetermined length in the width direction from the two side battery frames 11s (see FIG. 3). The protruding portion 11ra is a portion that is placed on the upper surface of the rear side frame 1 and fastened and fixed.

Each of the rear battery frame 11r, the front battery frame 11f, and the two side battery frames 11s has a substantially channel-shaped (so-called hat-shaped) cross section. The rear bracket 13 is joined to a bottom surface of the rear battery frame 11r. Accordingly, the rear battery frame 11r and the rear bracket 13 form a closed cross section (see FIG. 4).

The battery case 12 is a dish-shaped housing that has a rectangular opening and in which a battery is housed. The battery case 12 is disposed in a rectangular frame formed by the rear battery frame 11r, the front battery frame 11f, and the two side battery frames 11s. Therefore, a flange (not illustrated) is formed at the opening side peripheral edge of the battery case 12. The battery frame 11 is joined to the flange so as to be placed thereon.

The rear bracket 13 is joined to the bottom surface of the rear battery frame 11r. The rear bracket 13 is placed on upper surface portions close to the rear ends of the pair of rear side frames 1. In this state, the rear bracket 13 is fixed to predetermined portions close to the rear ends of the pair of rear side frames 1.

Therefore, the rear bracket 13 has, at predetermined positions in the vicinity of each of both ends thereof, one rear through hole 13a and two front through holes 13b. As illustrated in FIGS. 5 and 6, a fastening bolt 15 of a reinforcing plate 14 provided on the rear side frame 1 is inserted into the rear through hole 13a. A fastening nut 17 is screwed onto the fastening bolt 15.

Two fastening bolts 16r are inserted into the front through holes 13b. The two fastening bolts 16r are screwed with fastening nuts (not illustrated) of the reinforcing plate 14. Accordingly, the rear bracket 13 is fastened and fixed to the pair of rear side frames 1.

The front battery frame 11f is fixed to the second rear cross member 5, as illustrated in FIGS. 8 and 9. Therefore, the front battery frame 11f has, at predetermined positions in the vicinity of each of both ends thereof, two through holes 11a (see FIGS. 3 and 9). As illustrated in FIGS. 8 and 9, two fastening bolts 16f are inserted into the two through holes 11a. The two fastening bolts 16f are screwed with fastening nuts (not illustrated) joined to back surfaces of two nut arrangement holes 5a (see FIG. 9) of the second rear cross member 5. Accordingly, the front battery frame 11f is fastened and fixed to the second rear cross member 5. The second rear cross member 5 is formed by partially joining two members 5x and 5y each being formed by bending a plate-shaped member.

On the other hand, the reinforcing plate 14 is provided at a predetermined portion (see a reference sign P in FIGS. 5 to 7) close to the rear end of each of the pair of rear side frames 1. The reinforcing plate 14 is provided to improve a strength (for example, a bending strength) of each of the pair of rear side frames 1 in a predetermined region (here, within a range of a region P). Here, the region indicated by the reference sign P in FIGS. 5 to 7 is referred to as a reinforcing region P in the following description. In addition, in FIG. 7, a portion indicated by a reference sign B1 is the rear end of each of the pair of rear side frames 1, and is a joint portion with the extension 3 (not illustrated in FIG. 7). Further, a portion indicated by a reference sign B2 is a boundary portion between the reinforcing region P and a normal region in each of the pair of rear side frames 1. The details will be described in a description of an operation to be described later, and when a collision impact or the like from a predetermined direction is applied to the rear side frame 1, the joint portion B1 and the boundary portion B2 become positions at which the rear side frame 1 is bent.

The reinforcing plate 14 is formed of a plate member that is bent into a shape along an inner surface of each of the pair of rear side frames 1. The reinforcing plate 14 is joined to a back surface side of each of the rear side frames 1. In this case, portions all indicated by a reference sign WP in FIGS. 6 and 7 indicate multiple joint points (for example, multiple spot-welding points) of the reinforcing plate 14 with respect to the rear side frame 1. Therefore, the reinforcing plate 14 is firmly joined to the predetermined portions of each of the pair of rear side frames 1.

The reinforcing plate 14 has a bolt insertion hole 14a and two nut arrangement holes 14b, as illustrated in FIG. 6. The bolt insertion hole 14a is formed at a predetermined portion close to a rear end of the reinforcing plate 14. In addition, the two nut arrangement holes 14b are formed at predetermined portions in close to a front end of the reinforcing plate 14.

Here, a portion in which the bolt insertion hole 14a is disposed is referred to as a rear fastening portion RS which is a first fastening portion in the following description (see FIG. 7). In addition, a portion in which the two nut arrangement holes 14b are disposed is referred to as a front fastening portion FS which is a second fastening portion in the following description (see FIG. 7).

In this case, the front fastening portion FS has more fastening points than the rear fastening portion RS. For example, the rear fastening portion RS is fastened and fixed by one fastening point (the fastening bolt 15 and the fastening nut 17). In addition, the front fastening portion FS is fastened and fixed by two fastening points (the two fastening bolts 16r).

The fastening bolt 15 is joined to the bolt insertion hole 14a in a manner of protruding from a back surface toward an upper surface of the reinforcing plate 14. The fastening bolt 15 passes through the bolt insertion hole 14a in the reinforcing plate 14, passes through a through hole 1a in the rear side frame 1, and then passes through the rear through hole 13a in the rear bracket 13. Then, the fastening nut 17 is screwed onto the fastening bolt 15. Accordingly, (the rear bracket 13 of) the battery frame 11 is fastened and fixed to the rear side frames 1 at the rear fastening portions RS.

Fastening nuts (not illustrated, hereinafter referred to as back surface nut) are joined to a back surface side of the reinforcing plate 14 in the two nut arrangement holes 14b. The two fastening bolts 16r that pass through the front through holes 13b of the rear bracket 13, pass through through holes 1b of the rear side frame 1, and then pass through the nut arrangement holes 14b of the reinforcing plate 14 are screwed with the back surface nuts (not illustrated) of the two nut arrangement holes 14b. Accordingly, (the rear bracket 13 of) the battery frame 11 is fastened and fixed to the rear side frames 1 at the front fastening portions FS.

As described above, in the structure of the present embodiment, the rear fastening portion RS and the front fastening portion FS are disposed at positions sandwiching the rear battery frame 11r of the battery frame 11 in the front-rear direction (see FIG. 7 or the like).

In the structure of the present embodiment, on the rear side frame 1, the rear fastening portion RS is disposed in the vicinity of the boundary portion B2 with the reinforcing region P reinforced by the reinforcing plate 14 and at a position forward than the boundary portion B2. In addition, the front fastening portion FS is disposed further forward than the rear fastening portion RS. In this case, the rear fastening portion RS and the front fastening portion FS are disposed with the rear battery frame 11r sandwiched therebetween.

The reinforcing plate 14 has an area in which an area extending toward the front side of the vehicle M is larger than an area extending toward the rear side of the vehicle M across the region in which the rear side frame 1 and the protruding portion 11ra are fixed to each other.

Figure 10A:
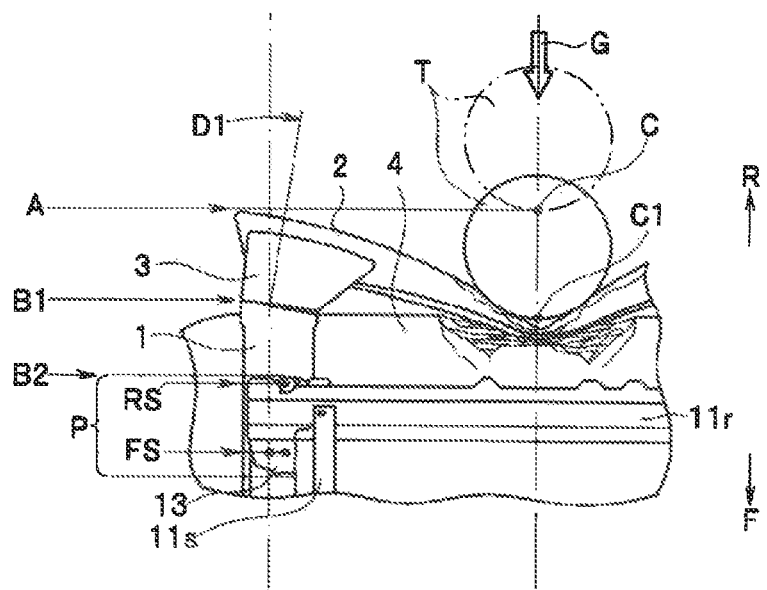
FIGS. 10A-10C are diagrams illustrating an operation when a collision impact or the like is applied to the battery unit mounting structure according to the embodiment from a rear of the vehicle.
Figure 10B:
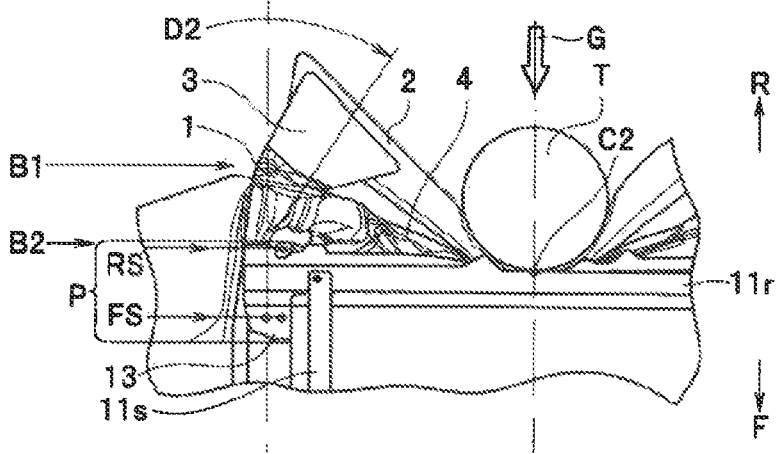
Figure 10C:
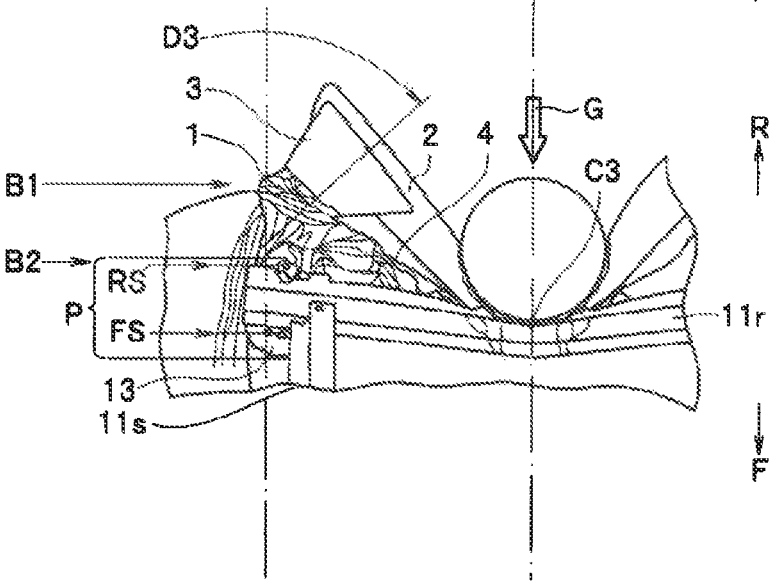

An operation of the battery unit mounting structure of the present embodiment configured as described above will be described below with reference to FIGS. 10A-10C. FIGS. 10A-10C are diagrams illustrating an operation when a collision impact or the like is applied to the battery unit mounting structure according to the present embodiment from the rear of the vehicle.

The operation to be described with reference to FIGS. 10A-10C is based on an assumption that a substantially cylindrical object (a test pole indicated by a reference sign T) collides with a substantially center position of the vehicle M in the width direction in a direction along an axial line of the vehicle M in the front-rear direction from the rear of the vehicle M. FIGS. 10A-10C illustrate a substantially one-side half portion of the vehicle M.

First, it is assumed that at a position illustrated in FIG. 10A, the test pole T collides with a substantially center position of the rear bumper beam 2 from an arrow G direction (rear side) in FIG. 10A. Here, a collision start position between the test pole T and the rear bumper beam 2 is indicated by a reference sign A in FIG. 10A, and a collision start point is indicated by a reference sign C in FIG. 10A.

As the test pole T moves further from the collision start point C in the arrow G direction, a collision energy causes the rear bumper beam 2 to bend toward a vehicle body inner side of the vehicle M around a collision point C1. Accordingly, the rear bumper beam 2 is deflected toward the vehicle body inner side around the collision point C1.

At this time, the rear bumper beam 2 is joined to rear ends of the extensions 3 in the vicinity of both ends. In addition, a front end of the extension 3 is joined to the rear end of the rear side frame 1. Therefore, as illustrated in FIG. 10A, when the test pole T moves from the collision start point C toward the arrow G direction (front side F), the rear bumper beam 2 is deflected, so that the extension 3 is pulled and bent inward at the joint portion B1 between the extension 3 and the rear end of the rear side frame 1. In FIG. 10A, a reference sign D1 indicates an inclination (deflection) due to bending of the extension 3. Then, the test pole T crushes the rear bumper beam 2, and a part of the rear bumper beam 2 collides with the first rear cross member 4, as illustrated in FIG. 10A. Accordingly, the first rear cross member 4 also begins to be crushed.

After the state of FIG. 10A, when the test pole T further moves from the collision point C1 in the arrow G direction and proceeds to a collision point C2 as illustrated in FIG. 10B, crushing of the rear bumper beam 2 and the first rear cross member 4 progresses. Therefore, the deflection (the inclination toward inside) caused by the bending of the extension 3 increases as indicated by a reference sign D2 in FIG. 10B. At the same time, the rear end of the rear side frame 1 begins to bend from the vicinity of the boundary portion B2. However, the fastening between the rear side frame 1 and the rear bracket 13 is maintained at the rear fastening portion RS.

Here, the rear end of the rear side frame 1 absorbs the collision energy by being deflected inward from the vicinity of the boundary portion B2 with the reinforcing plate 14. Accordingly, the collision energy to be applied to the rear fastening portion RS is reduced. Therefore, the rear fastening portion RS is prevented from being damaged.

At this time, a length of the rear side frame 1 on a rear side of the boundary portion B2 in the front-rear direction is relatively smaller than an overall length of the rear side frame 1. Therefore, the inclination of the rear end of the rear side frame 1 that is bent in the vicinity of the boundary portion B2 is reduced.

As described above, in the structure according to the present embodiment, when the vehicle M receives the collision energy of a rear collision, the rear side frame 1 itself is prevented from being inclined inward. Accordingly, a time until the crushing of the rear bumper beam 2 and the first rear cross member 4 reaches the rear battery frame 11r can be increased. Therefore, the damage to the rear battery frame 11r is reduced.

After the state of FIG. 10B, when the test pole T further moves in the arrow G direction from the collision point C2, as illustrated in FIG. 10C, the rear through hole 13a of the rear bracket 13 is finally cut at the rear fastening portion RS. Accordingly, a fastening force at the rear fastening portion RS is released.

Therefore, the rear end of the rear side frame 1 is increased in deflection (inclination toward inside) caused by the bending, as illustrated in a reference sign D3 in FIG. 10C. However, at this time point, the rear side frame 1 and the rear bracket 13 are firmly fastened at the front fastening portion FS (two-point fastening). Therefore, at this time, a rear side of the rear side frame 1 from the front fastening portion FS is deflected.

Here, for example, when the front fastening portion FS is not provided, the rear side frame 1 is further inclined inward as a whole at a predetermined portion on the front side.

Therefore, in the structure of the present embodiment, by providing the front fastening portion FS in addition to the rear fastening portion RS, for example, at the time point illustrated in FIG. 10C, the rear side of the rear side frame 1 from the front fastening portion FS is deflected. In this case, the inclination of the rear side frame 1 is reduced as compared with a case in which the rear side frame 1 is inclined as a whole.

Therefore, a movement amount from the collision point C2 in FIG. 10B to a collision point C3 in FIG. 10C is reduced. Accordingly, the damage to the rear battery frame 11r is reduced. Here, for example, in the present embodiment, since the damage to the rear battery frame 11r toward a forward direction is restricted within a predetermined separation distance L, the rear battery frame 11r does not come into contact with the battery inside the case.

When the test pole T further moves in the arrow G direction, as illustrated in FIG. 10C, the front through hole 13b of the rear bracket 13 is also cut at the front fastening portion FS. At the same time, the collision energy is transmitted to the front battery frame 11f through the two side battery frames 11s. Therefore, the joining between the front battery frame 11f and the second rear cross member 5 is separated.

For example, when the collision energy is transmitted to the front battery frame 11f, a fastening state between the front battery frame 11f and the second rear cross member 5 fastened by the two fastening bolts 16f is maintained, but joining between two members 5x and 5y constituting the second rear cross member 5 is separated. Accordingly, the battery unit 10 receives the collision energy, so that the battery unit 10 itself can be moved to the front of the vehicle M.

That is, at this time point, it can be said that the battery unit 10 is in a state in which a fixed state with the rear side frames 1 is substantially released. Therefore, at this time, the collision energy received by the battery unit 10 moves the battery unit 10 toward the front relative to the vehicle M. Therefore, thereafter, the battery unit 10 is not damaged by the received collision energy.

As described above, according to the above embodiment, the rear battery frame 11r extending in the vehicle width direction of the vehicle M in the battery frame 11 of the battery unit 10 includes, at both ends thereof, the protruding portions 11ra protruding in the vehicle width direction of the rear side frame 1. The protruding portions 11ra are fastened and fixed to the respective upper surfaces of the pair of rear side frames 1, and thus the battery frame 11 is fixed to the pair of rear side frames 1.

In each of the regions in which the pair of rear side frames 1 and the protruding portions 11ra are respectively fixed to each other, the reinforcing plate 14 is provided permanently with the rear side frame 1. The reinforcing plate 14 extends in the front-rear direction of the vehicle in each region in which the rear side frame 1 and the protruding portion 11ra are fixed to each other. The rear side frames 1 and the battery frame 11 are fixed to each other at the first fastening portion (rear fastening portion RS) on a rear side of the protruding portion 11ra and the second fastening portion (front fastening portion FS) on a front side of the protruding portion 11ra. That is, the first fastening portion (rear fastening portion RS) and the second fastening portion (front fastening portion FS) are disposed at positions sandwiching the protruding portions 11ra in the front-rear direction of the vehicle M.

Here, the second fastening portion (front fastening portion FS) comprises more fastening points than the first fastening portion (rear fastening portion RS). For example, the second fastening portion (front fastening portion FS) is fastened at two points and the first fastening portion (rear fastening portion RS) is fastened at one point.

The reinforcing plate 14 has the area in which the area extending toward the front side of the vehicle M is larger than the area extending toward the rear side of the vehicle M across the region in which the rear side frame 1 and the protruding portion 11ra are fixed to each other.

With such a configuration, according to the present embodiment, when a collision impact or the like is applied to the vehicle M from the rear side, the collision energy can be absorbed by bending the predetermined portion close to the rear end of the rear side frame 1, that is, the boundary portion B2 with the reinforcing plate 14.

By providing the first fastening portion (rear fastening portion RS) and the second fastening portion (front fastening portion FS), the deformation of the rear side frame 1 (inward deflection caused by the bending) can be reduced. Accordingly, the collision energy applied to a case member (rear battery frame 11r) of the battery unit 10 can be reduced, and thus the damage to the case member (rear battery frame 11r) can be reduced.

Further, when the first fastening portion (rear fastening portion RS) and the second fastening portion (front fastening portion FS) are sequentially broken in a stage before the case member (rear battery frame 11r) is deformed to a predetermined level or more, the battery unit 10 can be moved forward. Therefore, the deformation of the case member (rear battery frame 11r) can be reduced.

According to the present embodiment, the deformation of the rear side frames 1 can be reduced, and the amount of deformation of the battery case can be reduced.

The disclosure is not limited to the embodiments described above, and it is apparent that various modifications and applications may be made without departing from the spirit of the disclosure. Further, the embodiment includes disclosures at various stages, and the various disclosures can be extracted from the embodiment by appropriately combining multiple disclosed elements. For example, when the problem to be solved by the disclosure can be solved and the effect of the disclosure can be obtained even if some elements are deleted from all the elements described in the embodiment, a configuration in which the elements are deleted can be extracted as the disclosure. In addition, elements over the different embodiments can be combined as appropriate. The disclosure is limited by the appended claims, and is not limited by the specific embodiment.

According to the disclosure, it is possible to provide a battery unit mounting structure for a vehicle that can efficiently increase an amount of absorption of collision energy and reduce an amount of deformation of the battery case, while achieving a decrease in weight and a decrease in manufacturing cost of the battery case.

The invention claimed is:

1. A battery unit mounting structure for a vehicle, the battery unit mounting structure comprising:
   a left rear frame and a right rear frame in a pair, the left rear frame and the right rear frame extending along a front-rear direction of the vehicle;

a battery unit including
- a housing in which a battery is housed, the housing being disposed between the left rear frame and the right rear frame, and
- a battery frame provided with, at respective ends thereof, a left protruding portion and a right protruding portion each of which is provided permanently with a part of an opening side peripheral edge of the housing, extends in a vehicle width direction, and protrudes in the vehicle width direction beyond a space between the left rear frame and the right rear frame, the left protruding portion and the right protruding portion being fixed to respective upper surfaces of the left rear frame and the right rear frame; and reinforcing plates provided permanently with the left rear frame and the right rear frame in respective regions in which the left rear frame and the left protruding portion are fixed to each other and the right rear frame and right left protruding portion are fixed to each other, wherein each of the reinforcing plates extends in the front-rear direction of the vehicle in a corresponding one of the regions, and the battery frame and each of the left rear frame and the right rear frame are fixed to each other at a first fastening portion on a rear side of a corresponding one of the left protruding portion and the right protruding portion and a second fastening portion on a front side of the corresponding one of the left protruding portion and the right protruding portion.

2. The battery unit mounting structure for the vehicle according to claim 1, wherein the first fastening portion and the second fastening portion are disposed at positions sandwiching the corresponding one of the left protruding portion and the right protruding portion in the front-rear direction of the vehicle.

3. The battery unit mounting structure for the vehicle according to claim 2, wherein the second fastening portion comprises more fastening points than the first fastening portion.

4. The battery unit mounting structure for the vehicle according to claim 1, wherein in each of the reinforcing plates, an area extending toward a front side of the vehicle is larger than an area extending toward a rear side of the vehicle across the corresponding one of the regions.

5. The battery unit mounting structure for the vehicle according to claim 1, wherein the reinforcing plates are permanently joined respectively to the left rear frame and the right rear frame by spot-welding.

* * * * *